June 2, 1964 J. F. QUINN 3,135,819
SHUTTER CALIBRATING SYSTEM
Filed Feb. 2, 1961
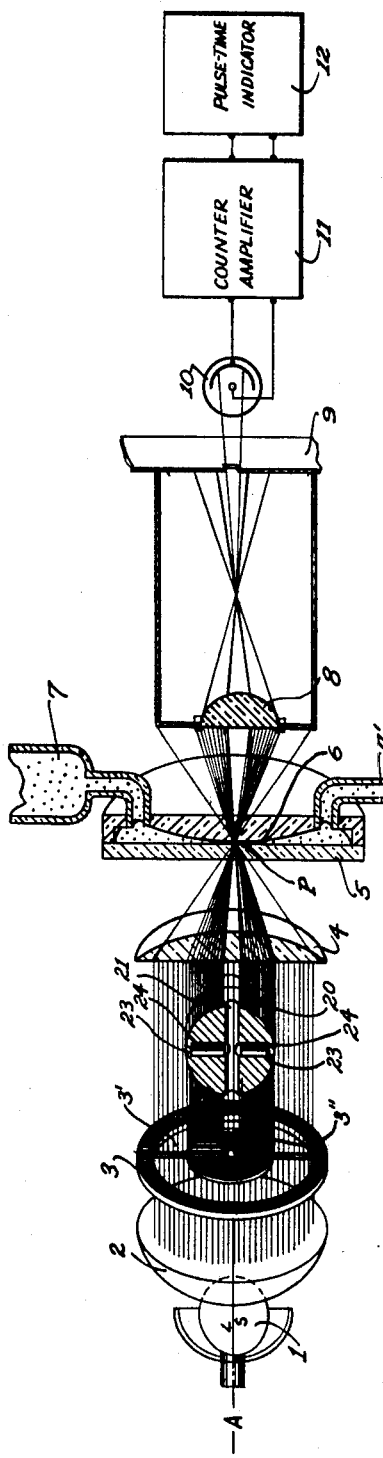
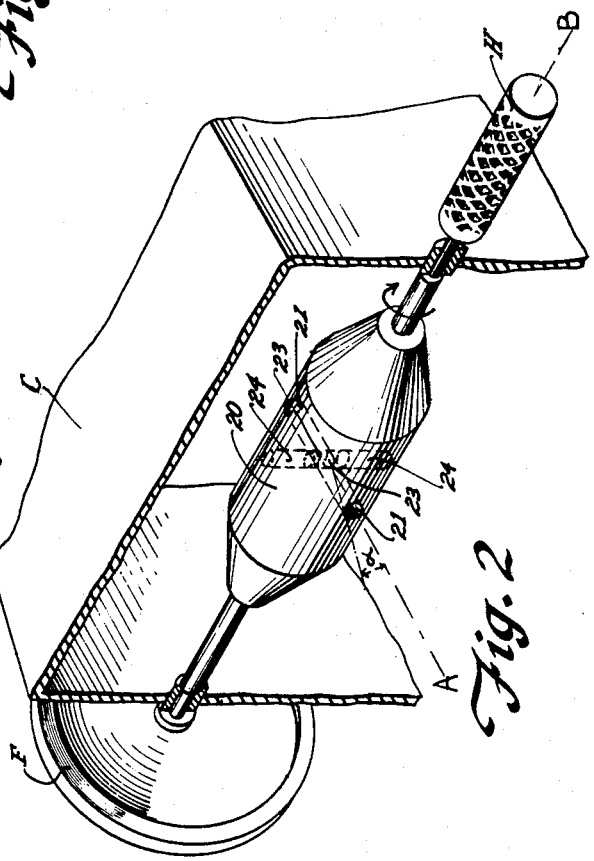
INVENTOR
JOSEPH F. QUINN
BY Rines and Rines
ATTORNEYS

United States Patent Office

3,135,819
Patented June 2, 1964

3,135,819
SHUTTER CALIBRATING SYSTEM
Joseph F. Quinn, Wellesley, Mass., assignor, by mesne assignments, to Sanborn Company, Waltham, Mass., a corporation of Delaware
Filed Feb. 2, 1961, Ser. No. 86,807
1 Claim. (Cl. 88—61)

The present invention relates to methods of and apparatus for calibrating impulse counters and the like; and, more particulary, to apparatus adapted not only to effect calibration of electronic pulse counter systems, but, also, to check the operability of the complete system, as well.

In electric-impulse counting or monitoring systems, it is sometimes desired to produce an indication of the percent of time that impulses are actually being received. As an illustration, in United States Letters Patent No. 2,775,159, issued to Joseph Frommer on December 25, 1956, there is disclosed an electronic blood-cell counter device in which electric impulses are generated by the passage of blood-cell particles through an inspection zone or region in the path of a light-beam directed through a blood sample upon a photo-multiplier tube or other light-sensitive detector associated with the counter system. The photo-multiplier detector converts the variations in light intensity resulting from the passage of blood-cell particles or the like, into corresponding electrical impulses that are amplified in the counter circuit and integrated to provide an indication of the percent of time that impulses are received; this percent constituting a measure of the count or number of particles.

In this type of system, and in other similar systems, it is important not only to be able readily to calibrate the system, in order to insure that the indicator indicates correct percentages of time for the reception of pulses, but, also, to determine whether the optical and electrical parts of the system are, in fact, at all times properly operative.

An object of the present invention, accordingly, is to provide a new and improved method of and apparatus for enabling calibration of the percentage of time that pulses are received in a counter system or the like, and simultaneously checking the proper operation of the apparatus.

A further object is to provide a new and improved checking system of more general utility, as well.

Other and further objects will be explained hereinafter and will be more particularly pointed out in connection with the appended claim. In summary, the present invention is particularly concerned with a system in which a light-responsive cell or other radiant-energy detector transmits a plurality of electric impulse signals into a circuit that is adapted to indicate the percent of time that the impulse signals are received. In accordance with the invention, a shutter is interposed between the light source and the cell or detector and is provided with an aperture for permitting light to pass from the source to the cell only when the shutter occupies a predetermined position. Means are provided for setting the shutter in motion to cause the aperture periodically to pass through the said predetermined position, thereby to generate in the cell or detector a plurality of calibrating or checking impulses. The dimensions of the aperture are selected so as to provide a predetermined calibrated percent of time of exposure of the cell or detector to the source, irrespective of the speed of motion of the shutter, in order that the indicator of the counter circuit may be calibrated and checked for the correct percentage indication.

The invention will now be described in connection with the accompanying drawing—

FIG. 1 of which is a combined fragmentary perspective and block circuit diagram of a counter constructed in accordance with a preferred embodiment of the present invention; and FIG. 2 is an enlarged perspective of the shutter mechanism of FIG. 1.

A light source 1 is shown transmitting through a condenser lens 2 substantially parallel rays of light towards a photo-multiplier detector or cell 10, of an electronic counter system, such as, for example, a system of the type disclosed in the said Letters Patent. Such a system may embody, for example, counter amplifier stages 11 and an integrating indicator circuit 12 that is adapted to indicate the percent of time that signal impulses are passed through the amplifier 11, as explained in the said Letters Patent. The parallel rays are passed through a dark-field stop 3, comprising an outer annular aperture 3' and an inner aperture 3", preferably alined along the axis A of the optical system. As later explained, the small inner path of light through the aperture 3" will, in effect, determine the pulse amplitude of the signals ultimately generated by the impingement of light signals upon the light-responsive detector 10. The outer parallel lines or rays indicate the passage of light through the annular aperture 3' to a second condenser lens 4, whence the rays are focused upon an inspection zone or region P within a chamber 6 of a light-transparent housing 5, as of glass. A reservoir 7 is connected at the top of the chamber 6 and it contains the blood sample or other sample of particulate matter that flows, preferably downward at a substantially uniform rate, through the chamber 6 to an outlet 7'. The light is converged upon the inspection region P of the chamber 6. The diverging rays emanating from the inspection region P are oriented in a direction so as not to enter the objective lens 8 and the subsequent parts of the system; namely, the aperture 9 and photocell 10. The objective lens is positioned within the shadow created by dark field stop 3. When a blood cell or other particle passes into region P, it refracts the impinging radiant energy in all directions in spherical-scattering fashion. That portion of the refracted energy that falls into the shadow area is converged upon the back face of aperture disc 9. The portion falling in the aperture area will fall upon the photo multiplier or other light-sensitive detector 10.

In accordance with the present invention, a particular kind of shutter 20 is interposed between the light rays passing through the inner aperture 3" of the disk 3, in the shadow of the dark field portion thereof, and the lens 4. The shutter 20 is preferably, at least in part, of cylindrical circular cross-section, provided with a first diametric transverse recess or aperture 21, FIGS. 1 and 2, and a second preferably orthogonally intersecting diametric recess or aperture 23. Aperture 21 is open at its opposite ends to provide for light transmission therethrough when alined with the axis A; whereas, the recess 23 is closed at its outer ends. Disposed within the recess 23 is a pair of slidable cylinders 24, the total sum of the length of which is sufficient to close off the recess 21 when the shutter 20 is stationary, but which, when centrifugally forced outward during rotation of the shutter 20 about the axis B, transverse to the axis A, permit the aperture 21 to remain open.

The shutter 20 may be set into rotation in any desired manner, as by a knob H disposed along the axis B and counter-balanced by a fly-wheel F for insuring that the shutter turns a large number of times to enable calibration and checking. The shutter 20 is shown axially mounted within a light-shielded housing C with the knob H and fly-wheel F external thereto. Only when the aperture 21 becomes alined with the optical axis A will light pass through the aperture 21, finally to impinge upon the inspection region P of the chamber 6. By selecting a predetermined value of angle α, between the axis A and the uppermost or lowermost point of the aperture 21 along the cylindrical shutter surface 20, FIG. 2, one may select a predetermined percent of shutter open area. This percent is the same, of course, irrespective of the speed of rotation of the shutter 20. Impulses of light will be impinged upon the photo-multiplier detector 10 only at the times of alinement of the aperture 21 with the axis A, which for a complete rotation of the shutter 20 about the axis B, is two times per rotation. These impulses will be received, moreover, a predetermined percentage of the total time determined by the value of the angle α and this, irrespective of the speed of rotation of the shutter 20. A corresponding electrical impulse signal will thus be generated at 10 and passed through the amplifier 11 to the pulse-time indicator 12. Calibration of the indicator 12 may thus be effected in accordance with the known value of the predetermined percentage of open-to-shut shutter dimensions.

In operation, one merely twists the hand knob H to set the shutter 20 into rotation. The fact that the speed of rotation ultimately lessens during the periodic presentation of the aperture 21 to the axis A is of absolutely no concern in this calibrating of the indicator 12. In addition, incidentally, the injection of these periodic checking impulses serve to check the proper operation of both the optical and electronic portions of the counter.

Other types of optical and electronic apparatus may also be employed with the calibrating and checking apparatus of the present invention. The dark field disk optical system is deemed preferable, however, since it is only the light in the shadow of the dark field disk that passes through the small-path central aperture 3'' that is important to the operation of this system. The presence of any scattered light, of course, would introduce errors and spurious results into the calibration of the system. Similarly, other shutter-rotating or moving mechanisms may be employed, including motor-driven apparatus; but the hand knob H is considered preferable because of its simplicity and because the present invention provides for calibration irrespective of the speed of movement of the shutter. The principles of the present invention are also clearly applicable, also, to other types of radiant energy than visible light.

Further modifications will also occur to those skilled in the art and all such are considered to fall within the spirit and scope of the invention as defined in the appended claim.

What is claimed is:

In an electric system for receiving radiant energy impulses from a source of radiant energy, a shutter disposed between said source and said system and comprising cylindrical shutter means rotatable about its longitudinal axis which is disposed normal to the direction of the radiation from source to system, the shutter means being provided with a diametrically extending aperture for permitting the passage of radiant energy between the source and system only upon alignment of the aperture with said direction, the angular dimension of the aperture along the cylindrical surface of the shutter means being a predetermined percent of the cylindrical surface in order to establish a predetermined calibrating percent of open-to-shut shutter dimension, another diametrically extending aperture in said shutter means closed at its ends and intersecting the first mentioned aperture, slidable means within said other aperture having dimensions sufficient to block the passage of radiation through the first-mentioned aperture when the shutter means is stationary and being responsive to the rotational motion of said shutter means to be centrifugally held radially away from said first-mentioned aperture for passing radiation therethrough, means for rotating the shutter means to cause the aperture successively to become aligned with said direction twice each rotation of the shutter means for passing the radiant energy through said aperture to reach the system in impulses with the percent of time of impulse reception corresponding to said predetermined calibrating percent and independent of the speed of rotation of the shutter means, thereby to enable checking and indication-calibrating of the system.

References Cited in the file of this patent

UNITED STATES PATENTS

| | | |
|---|---|---|
| 1,609,961 | Readeker | Dec. 7, 1926 |
| 1,996,233 | Darrah | Apr. 2, 1935 |
| 2,594,758 | Fischer | Apr. 29, 1952 |
| 2,941,445 | Kuhnert et al. | June 21, 1960 |
| 2,967,450 | Shields et al. | Jan. 10, 1961 |
| 3,045,123 | Frommer | July 17, 1962 |

FOREIGN PATENTS

| | | |
|---|---|---|
| 276,745 | Great Britain | Sept. 5, 1927 |
| 617,609 | Great Britain | Feb. 9, 1949 |